United States Patent [19]

Dutt et al.

[11] Patent Number: 4,683,016
[45] Date of Patent: Jul. 28, 1987

[54] PROCESS FOR FORMING A TWO PART CLOSURE

[75] Inventors: Herbert V. Dutt, Sarasota, Fla.; Istvan Foldesi, Laval, Canada; Paul A. Santostasi, Sarasota, Fla.

[73] Assignees: Sun Coast Plastics, Inc., Fla.; Montreal Milling Cutter and Company, Inc., Quebec, Canada

[21] Appl. No.: 771,952

[22] Filed: Sep. 3, 1985

[51] Int. Cl.⁴ .................. B29C 65/02; B32B 31/12; B32B 31/20; B65D 51/20

[52] U.S. Cl. .................................. 156/69; 264/153; 264/249

[58] Field of Search ............... 156/69, 293; 264/249, 264/134, 248, 153; 215/341, 347, 329, DIG. 1

[56] References Cited

U.S. PATENT DOCUMENTS

| | | |
|---|---|---|
| 2,003,682 | 6/1935 | Enock . |
| 2,175,338 | 10/1939 | Booth . |
| 2,259,748 | 10/1941 | Hullhorst . |
| 2,575,863 | 11/1951 | Clifcorn . |
| 2,799,981 | 7/1957 | Baker-Carr et al. . |
| 3,214,887 | 11/1965 | Weller . |
| 3,232,470 | 2/1966 | Gibson .................. 215/43 |
| 3,460,310 | 8/1969 | Adcock et al. ........... 53/39 |
| 3,491,510 | 1/1970 | Sternau . |
| 3,509,682 | 5/1970 | Logemann . |
| 3,892,351 | 7/1975 | Johnson et al. ......... 229/43 |
| 3,959,061 | 5/1976 | Renck et al. ........... 156/262 |
| 4,044,941 | 8/1977 | Knudsen ............... 229/43 |
| 4,065,909 | 1/1978 | Mueller ................. 53/15 |
| 4,068,450 | 1/1978 | Easter ................. 53/331 |
| 4,094,460 | 7/1978 | Scanga et al. .......... 229/43 |
| 4,109,815 | 8/1978 | Collins, III ........... 215/232 |
| 4,180,961 | 1/1980 | Collins, III ........... 53/421 |
| 4,205,502 | 6/1980 | Ahlers ................. 53/308 |
| 4,276,989 | 7/1981 | Hicks ................. 215/270 |
| 4,282,698 | 8/1981 | Zimmermann ........ 53/582 |
| 4,362,002 | 12/1982 | Rowland et al. ....... 53/478 |
| 4,378,892 | 4/1983 | Ochs et al. ............ 215/232 |
| 4,381,840 | 5/1983 | Ostrowsky ............ 215/329 |
| 4,461,393 | 7/1984 | Dutt .................. 215/329 |
| 4,462,502 | 7/1984 | Luenser et al. ........ 215/329 |
| 4,473,163 | 9/1984 | Geiger ................ 215/250 |
| 4,501,371 | 2/1985 | Smalley .............. 215/232 |
| 4,566,603 | 1/1986 | Moore ............... 215/329 |

Primary Examiner—Jan H. Silbaugh
Assistant Examiner—Karen D. Kutach
Attorney, Agent, or Firm—Jones, Tullar & Cooper

[57] ABSTRACT

A two part closure for a container is comprised of a flexible foil sealing disk together with a flanged linerless screw threaded closure cap. During the process of applying the closure to a container, the flexible foil sealing disk is formed, heated, and is tack adhered to the rim of the container. A closure cap having downwardly extending spaced sealing flanges is then screwed onto the container. The cap's sealing flanges contact the flexible foil sealing disk on opposite edges of the container's mouth rim and, as the cap is screwed down, these flanges bring the flexible foil sealing disk into continuous, intimate sealing contact with the container rim. Additionally, the inner closure flange draws the portion of the flexible foil sealing disk situated within the container mouth tight to eliminate creases and wrinkles in the foil sealing disk. Once the closure cap has been applied and tightened down, the two part closure is subjected to a second heating step to fully activate the heat sensitive adhesive carried on the under surface of the flexible foil sealing disk thus securely adhering the flexible foil sealing disk to the container. Once the closure has been opened and the foil sealing disk removed, the container can be released by using the flanged linerless closure cap. Several preferred embodiments of flexible foil sealing disk forming and applying assemblies are usable to form the foil disks and to tack adhere them to the mouths of containers.

7 Claims, 10 Drawing Figures

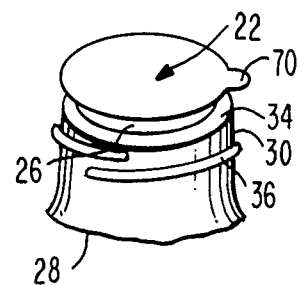
FIG. 2
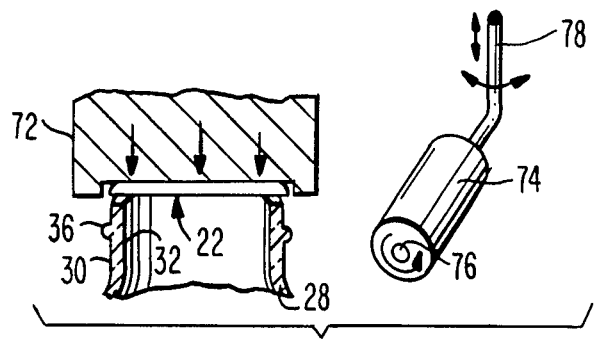
FIG. 3
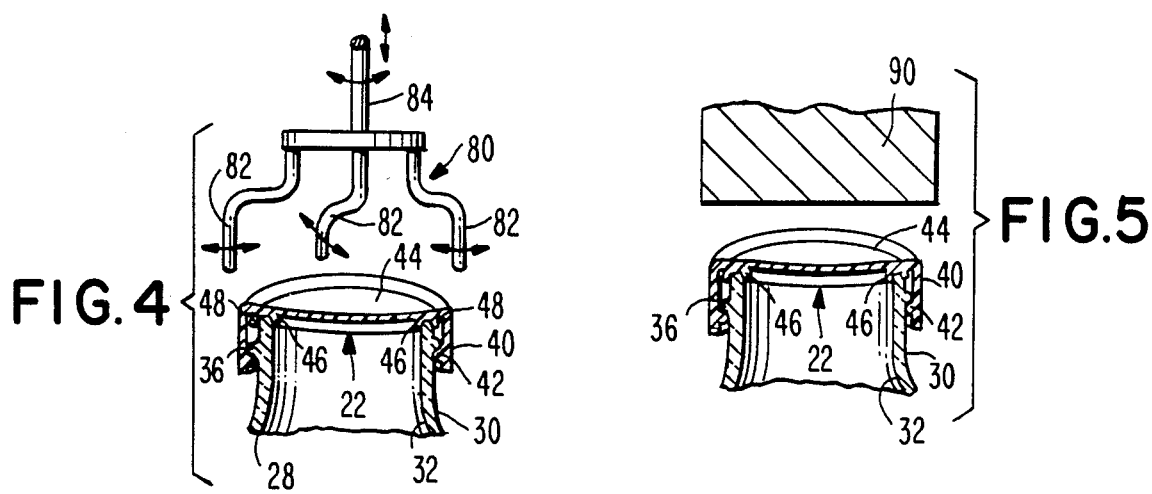
FIG. 4
FIG. 5

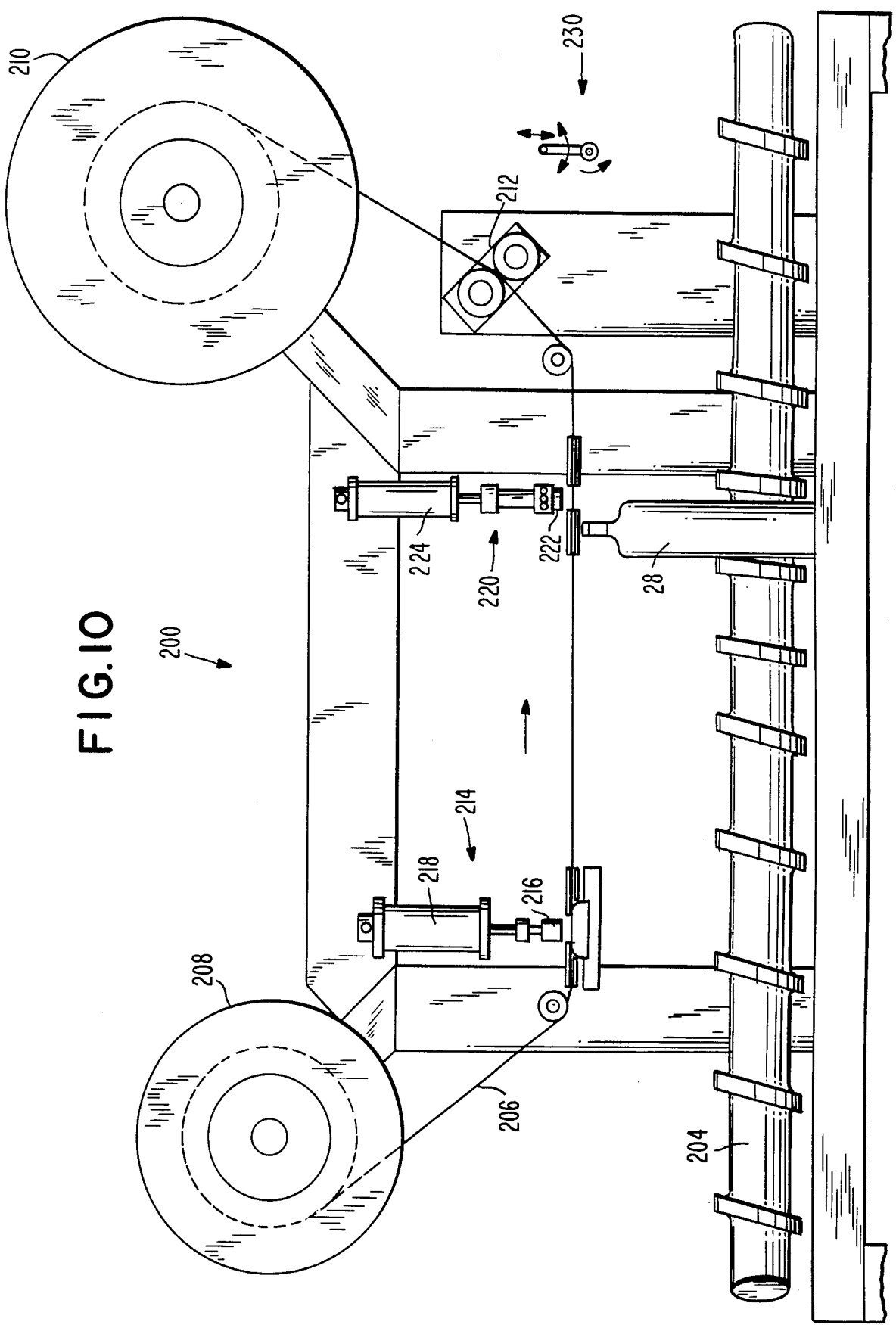

PROCESS FOR FORMING A TWO PART CLOSURE

CROSS REFERENCE TO RELATED APPLICATIONS

The present application is related to co-pending applications entitled "Two Part Closure", now U.S. Pat. No. 4,637,519 and "Apparatus For Forming and Attaching A Flexible Foil Sealing Disk" Ser. No. 771,933 and filed on even date herewith.

FIELD OF THE INVENTION

The present invention is directed generally to a two part container closure and to a process and apparatus for its application to a container. More particularly, the present invention is directed to a two part closure utilizing a sealing disk such as a flexible foiler film or any other adhesive backed membrane combined with a plastic closure. Most specifically, the present invention is directed to a two part closure having a foil sealing disk and flanged linerless closure cap, which closure is applied to the container in a process utilizing foil seal forming and supplying machinery. The foil sealing disks are either partially or fully severed from a continuous web and are applied to the mouth of the container by conductive or inductive heat actuation of an adhesive layer or film carried by the foil disk and by application of sufficient pressure to tack the disk to the container mouth. A linerless closure cap having spaced sealing flanges is then applied to the container. The sealing flanges contact the foil closure disk and, as the cap is tightened down on the container, act to stretch the foil sealing disk so that a uniform continuous seal between the foil and the upper surface of the container mouth is effected. The applied cap and foil disk assembly is then heated to securely bond the foil disk to the container. The apparatus used to form and apply the foil disks to the containers utilizes either an endless web of foil from which the disks are formed, or can use previously cut and stacked disks. Either a single row of containers or multiple rows thereof can be closed by the foil disk applying apparatus of the present invention. The two part closure in accordance with the present invention is air tight, tamper indicative, and resealable in a manner far superior to present closure assemblies.

DESCRIPTION OF THE PRIOR ART

Screw threaded closure caps are generally well known for use with various containers such as are typically made of glass or plastic and, in some instances, of metal. These caps take many forms with some being provided with various liners typically made of liner board or paper. Other closures are linerless, but may be structured having container mouth engaging flanges whose purpose is to provide a seal between the closure cap and the container. The use of flexible sealing films or foils in conjunction with container mouths is also generally known in the prior art. These foil or other flexible closures or seals typically extend across the mouth of the container and act to seal or close the mouth until such time as a separate cap is initially removed. The foil or film seal is then removed to afford access to the container, and is discarded. After this sealing foil or film has been removed, re-sealing of the container is dependant on the closure cap itself.

So-called two part foil and screw cap closures in accordance with the prior art have typically been supplied to the user with the foil member held within the screw closure. As may be appreciated, these thin, light foil or film members are apt to become separated from the cap during handling and placement on the container. Obviously if the foil falls out of the closure prior to its placement on the container, the effectiveness of the closure is compromised. Further, the consumer will quite probably refuse to accept a container whose film closure is not present, fearing that the container's contents may have been tampered with. Another problem with such arrangements is one of slippage rather than complete loss of the foil or film in the cap prior to application to the container, causing misalignment of the foil and container. This again results in an unsatisfactory closure.

To overcome such problems, it has been proposed to apply the foil or film to the mouth of the container prior to placement of the screw cap onto the container. This has been accomplished by various closure and foil or film applying machines. Often the foil or film is cut from a supply web and is attached directly to the container by use of an adhesive means. Machinery of this general type has been apt to be complex, costly, and prone to mechanical failure. Additionally, if the foil or film disks are cut from the supply web and applied to the container at one position, there has been a problem with contamination of the container's contents with scrap pieces of the foil or film material.

Foil and film closure seals applied to containers in accordance with prior art practices have suffered from incomplete sealing failures. The various containers to which these flexible disks are applied are themselves mass produced and may not be completely planar across the top surfaces of their mouths. If the foil or film disk is pushed against the container by a die head or the like, unless the container mouth's upper surface is uniformly planar, the seal between the disk and container mouth will be apt to have gaps in it. Use of prior art screw closures to force the foil or film into continuous engagement with the container mouth upper surface is also not sufficient in all cases to provide a continuous seal, again because the screw cap and the container mouth may not have cooperatingly planar surfaces along their complete line of contact or, as frequently happens, non-contact. Again, the seal is incomplete and the consumer will have doubts whether or not the container's contents are fresh and safe for their intended use.

If the film or foil liner closure is not completely or properly attached to the container mouth, the foil is also apt to be wrinkled and not smooth when the consumer removes the outer screw cap. Even if the foil or film has been completely sealed, it is apt to be somewhat wrinkled or creased. This type of appearance also does little to enhance consumer confidence in the purity of the container's contents.

The foil or film disk must be removed from the container to allow the consumer access to the container's contents. Since such foil or film disks are not reattachable to the mouth of the container, they are not usable once they have initially been removed. In these two part seal systems, the sealing of the once opened container is left to the screw closure cap by itself since the film or foil disk has been removed. If the cap has a liner of liner board or the like to effect sealing, it is apt to be an expensive, complex cap. Linerless closure caps have a substantial cost benefit when compared with lined caps but have historically not been as frequently used in situations where a positive seal was desired.

As can be seen, there is a need for a two part closure utilizing a foil or film inner seal with a screw closure cap which will produce a positive, dependable, easy to use seal assembly that can be applied to a container in an expeditious manner, and that allows the container to be resealed after its initial opening. The closure, its process of application, and the foil or film seal forming and applying apparatus as disclosed herein provide such a two part foil seal and linerless screw closure assembly and apparatus.

SUMMARY OF THE INVENTION

It is an object of the present invention to provide a two part foil seal and screw thread closure.

Another object of the present invention is to provide a process for sealing a container.

A further object of the present invention is to provide a container sealing apparatus.

Yet another object of the present invention is to provide a foil and screw closure utilizing a flanged linerless screw closure cap.

Still a further object of the present invention is to provide a process for positively sealing a foil disk to a container mouth utilizing a flanged closure cap.

Even yet another object of the present invention is to provide an apparatus for forming and attaching foil disks to container mouth openings.

Still yet a further object of the present invention is to provide a two part closure having a heat activated foil seal disk and a flanged linerless screw threaded closure cap.

A still further object of the present invention is to provide a process and apparatus for accomplishing the securement of a heat activated adhesive backed foil disk to a container opening.

As will be discussed in greater detail in the description of the preferred embodiment which is set forth subsequently, the foil sealing disk to be attached to the mouth of a container to be sealed is formed by being cut from a continuous web of an adhesive backed foil. The foil or film disk is cut at a location remote from its point of attachment to the container and is either completely severed from the web and transferred to the container by a rotating plate, or, alternatively, is only partially severed from the web which is then advanced to an application position. In either instance, the foil disk, which is backed with a heat activated adhesive film or layer, is heated sufficiently by a conductive or inductive heater to activate the adhesive as the disk is applied to the previously filled container's mouth to lightly tack the foil to the container mouth. The foil disk is sized to be generally the same as the container mouth's outer diameter and is preferably slightly oversized. A pull tab is also provided at the edge of the disk for ease in seal removal. This pull tab is rolled up onto the seal after the seal has been tacked to the container. The sealed container then receives a flanged linerless screw closure that is provided with spaced, downwardly extending sealing flanges. These flanges contact the foil in the region of the inner and outer edges of the container mouth opening. During tightening of the screw cap onto the container, the sealing flanges press the foil sealing disk down and effectively tension the disk so that it is pulled into continuous intimate contact across the surface of the container mouth from the inner edge, across the top and to the outer edge. This tightening of the foil sealing disk also insures that the foil contacts the container mouth's upper surface around the complete length or circumference of the container's mouth. Thus the foil sealing disk is caused to sealingly engage the entire container mouth due to the force exerted on it by the sealing flanges of the closure cap. Once the closure cap has been tightened, the closure assembly is again heated to complete the adhesive sealing of the foil on the container.

An additional benefit provided by the cooperation of the foil sealing disk and the flanged closure cap is that the downwardly depending sealing flanges press downwardly on the foil sealing disk to remove any wrinkles or creases that may be in it. The consumer thus sees a foil sealing disk which is both completely sealed around the edge of the container and is also drawn taut over the mouth of the container. Such a closure is visually attractive and forms a neat, smooth, finished appearing product.

The sealing disks such as a flexible foil or film or any other adhesive backed membrane according to the present invention are produced and applied to the closure in a process which uses an apparatus that severs the sealing disks from an elongated web of material and that heats the disk and attaches it to the container with only enough pressure that the foil disk is tacked to the container mouth. The individual foil sealing disks can either be completely severed from the web and transferred by a rotatable plate to a heating and applying station, or can be partially severed from the web which is then passed between the container and the heating and applying station where they are then completely removed from the web. In either instance, the actual web cutting to form the foil sealing disks is done at a location remote from the point of attachment of the sealing disks to the container so that there is little likelihood of contamination of the container's contents with bits of foil material.

The linerless screw threaded flanged closure cap used in the two part closure in accordance with the present invention has several advantages. As was discussed previously, the sealing flanges contact the tacked-on foil seal disk and insure that it is forced into intimate contact with the container mouth's upper surface. Further, the foil sealing disk is stretched taut and forms a finished appearing seal. Once the container has initially been opened and the foil sealing disk removed, the flanged cap provides excellent re-seal capabilities. In contrast, prior caps that have previously been used with foil sealing disks did not function to provide adequate seals once the foil sealing disk had been removed.

Since the flanged, screw threaded closure cap used in the two part closure process of the present invention to form the two part closure is linerless, it is less expensive than prior art lined caps. Further, there is no liner board or other possibly non-inert material that can be brought into contact with the contents of the container once the foil seal disk has been removed. In addition, since the foil sealing disk is not supplied with the cap, it cannot become lost or displaced prior to attachment to the container.

The two part foil sealing disk and flanged linerless screw threaded closure in accordance with the present invention forms a container closure having several distinct advantages over the prior art two part closures. It is applied in a process and using machinery which results in a properly applied, intimately sealed foil disk whose proper sealing is effected by the flanged closure cap and the cooperation of the flanges with the foil disk.

The closure so produced provides an attractive, fully attached foil seal with the container, and even after seal removal, the container is still completely resealable by the flanged linerless screw threaded closure cap by itself.

BRIEF DESCRIPTION OF THE DRAWINGS

While the novel features of the two part foil seal and flanged linerless closure and of the process and apparatus for the closure's attachment to a container are set forth with particularity in the appended claims, a full and complete understanding of the invention may be had by referring to the detailed description of preferred embodiments, as is set forth hereinafter and as illustrated in the accompanying drawings in which:

FIG. 2 is a schematic perspective view of a foil seal placing step in the process of applying the two part closure to a container;

FIG. 3 is a side elevation cross-sectional view of a seal tacking step;

FIG. 4 is a side elevational, cross-sectional view of a closure cap applying step in the process in accordance with the present invention;

FIG. 5 is a side elevation cross-sectional view of a final heating step in the two part closure applying process in accordance with the present invention;

FIG. 10 is a side elevation view of the apparatus of FIG. 9.

DESCRIPTION OF PREFERRED EMBODIMENTS

Figure 1:
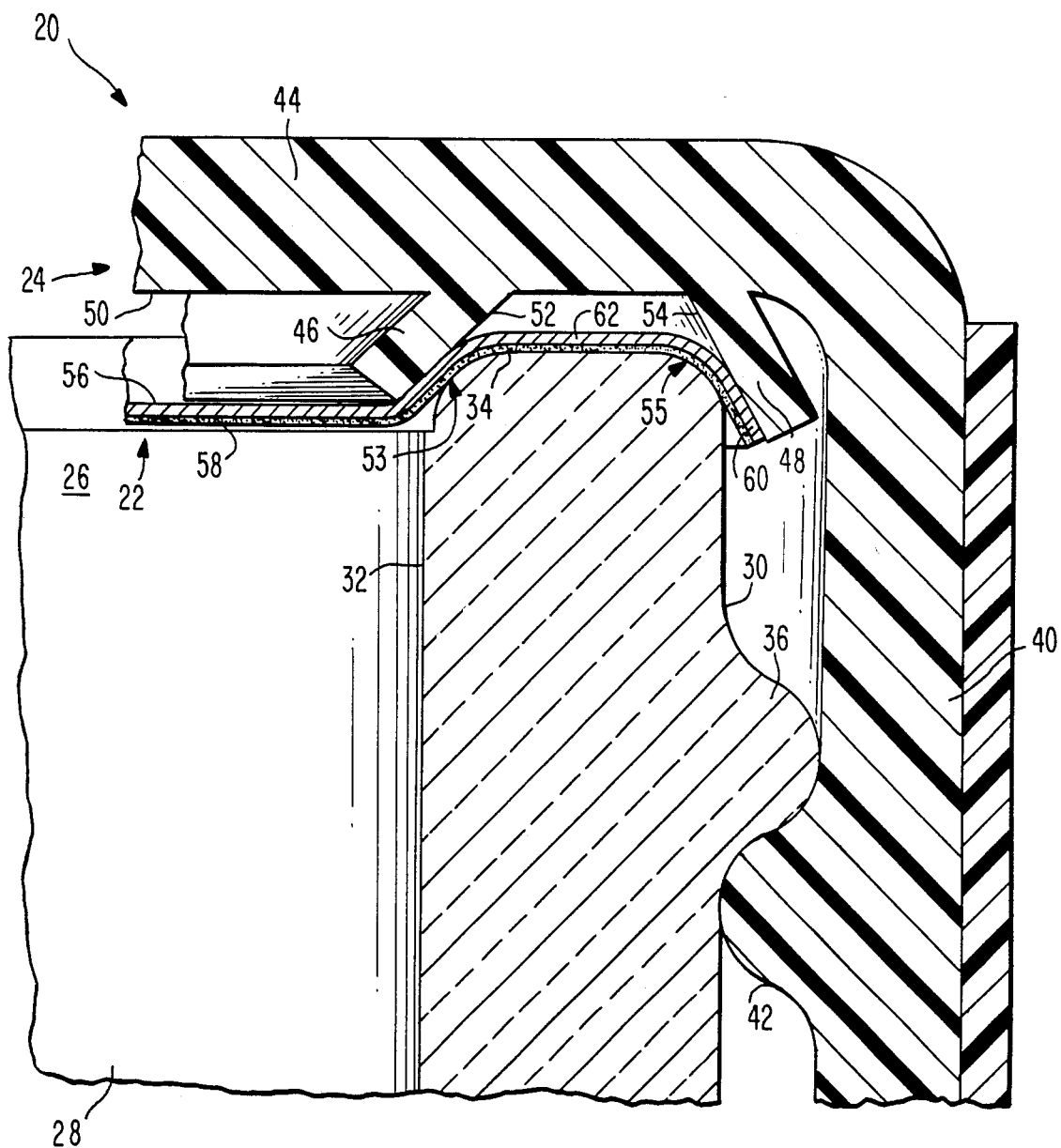
FIG. 1 is a cross-sectional side elevation view of the two part foil seal and flanged screw threaded cap closure in accordance with the present invention.

Referring initially to FIG. 1, there may be seen generally at 20 a two part closure for a container in accordance with the present invention. Closure 20 is comprised generally of a thin flexible foil sealing disk or member, generally at 22, and a flanged linerless screw threaded plastic closure cap generally at 24. Two part closure 20 is intended to sealingly close the open mouth portion 26 of a generally cylindrically necked container 28. An outer neck wall 30 of container 28 and a spaced inner neck wall 32 define the thickness or width of an upper, generally planar rim 34. Container 28 is provided with a conventional screw threaded finish 36 on the exterior neck wall 30. Such containers, of which container 28 is exemplary, are well known in the art and need not be discussed in great detail.

Closure cap 24 is, as may be seen in FIGS. 4 and 5 as well as FIG. 1, comprised of a generally cylindrical wall 40 having an inner screw thread 42 which cooperates with screw thread 36 on container 28 to fasten the closure cap to the container. A generally planar top portion 44 of closure cap 24 has a pair of spaced inner and outer downwardly extending sealing flanges 46 and 48, respectively, secured to an inner surface 50 of cap top 44. Closure caps of this general type and structure and their usage with threaded container openings are set forth in U.S. Pat. No. 4,143,785 to Ferrell, whose disclosure is hereby incorporated herein by reference. In a typical application, the linerless cap 24 is secured by its screw threads to a cooperating container 26, with an outer radial surface 52 of inner sealing flange 46 and an inner radial surface 54 of outer sealing flange 48 engaging the inner and outer edges 53 and 55, respectively, of container rim 34, thereby sealing the container.

As may also be seen in FIG. 1 as well as in FIGS. 2–5, in the two part closure assembly 20 in accordance with the present invention the flexible thin foil sealing disk 22 is placed across the mouth 26 of container 28 with the peripheral portion of disk 22 being sandwiched between the container's mouth rim 34 and the spaced sealing flanges 46 and 48. As will be discussed in greater detail below, it is the cooperation of the sealing flanges 46 and 48 on closure cap 24 with the flexible foil sealing disk 22 that makes the two part closure assembly 20 of the present invention function in such a superior manner.

Flexible foil sealing disk 22 is typically formed from a thin flexible sheet or web of metal foil 56 which is provided with an inner layer 58 of a heat activated adhesive film. Since such flexible foil sealing disks are generally known in the art, a further discussion of the specific compositions of metal and adhesive film suitable for use with various container contents is believed unnecessary.

As may be seen most clearly in FIG. 1, the diameter size of foil sealing disk 22 is slightly greater than that of container mouth 26. This provides an annular skirt 60 around the edge of flexible disk 22 when disk 22 is properly positioned atop container rim 34. This skirt overlies the upper outer wall 30 of container mouth 26 in the region of outer edge 55 and is engaged by the inner surface 54 of outer sealing flange 48. When flexible sealing disk 22 is positioned on container rim 34 and is engaged by spaced sealing flanges 46 and 48 of closure cap 24, two distinct and beneficial things occur as the cap is tightened onto the container. As the sealing flanges 46 and 48 move downwardly, toward contact with the inner and outer edge portions 53 and 55 of rim 34, they engage the interposed peripheral portion 62 of flexible foil sealing disk 22 and press the disk, which initial lightly rested on the top of rim 34, into firm, positive sealing engagement with the upper surface of container mouth rim 34. As the cap is further tightened, the inner flange 46 exerts a force downwardly on the foil disk 22 interiorly of the container's inner neck wall 32 while the outer flange 48 presses the skirt portion 60 downwardly toward the exterior finish portion of the container, thereby drawing the flexible foil disk 22 tight. This removes any wrinkles and creases to render this portion of the flexible foil sealing disk smooth and uniform in appearance to provide a positive foil seal that reassures consumers of product integrity and also presents a smooth appearance. The flexible disk is also pulled taut in the peripheral region 62 overlying container rim 34 the combined action of the two flanges 46 and 48 in the edge regions 53 and 55, so that any rim irregularities such as saddle defects, bumps and the like are accommodated, thus forming a continuous peripheral seal across the width of rim 34.

After the container has been initially opened and the flexible foil sealing disk removed, the container can be securely resealed due to the action of the downwardly depending sealing flanges 46 and 48 which function to form a positive seal, as discussed in the aforementioned Ferrell patent. Although not specifically shown, it will be understood that closure cap 24 could also be provided with some type of tamper evident sidewall construction. This in combination with the two part closure of the present invention would further assure the consumer of the integrity of the contents of the container.

Referring now to FIGS. 2-5 in conjunction with FIG. 1, the process for forming the two part closure assembly of the present invention will now be described in greater detail. As may be seen in FIG. 2, a flexible foil sealing disk 22 is formed by suitable means, such as will be discussed shortly in the discussion of the apparatus. As may also be seen in FIG. 2, flexible foil sealing disk 22 may include an outwardly extending pull tab 70 that provides a grasping means usable by the consumer to remove the foil when the container is to be opened. Foil sealing disk 22 is positioned generally above mouth 26 of container 28 and is then heated, preferably by a conductive heating means and die assembly, generally at 72 in FIG. 3. This assembly 72 supplies sufficient heat to flexible foil sealing disk 22 to render the heat-activated adhesive layer or film 58 sufficiently tacky so that when the heater and die assembly 72 moves downwardly and brings the flexible foil sealing disk 22 into contact with rim 34 of container neck, the foil disk will tack adhere to the rim 34 of the container. It should be kept in mind that the purpose of heater and die assembly 72 is only to render the adhesive film or layer tacky and to bring the foil disk 22 into contact with the rim surface 34 of the container. This step positions the sealing disk for further steps and insures that it will stay in place as the container is moved and the cap applied.

Once the flexible foil sealing disk 22 has been tacked to container rim 34, the container 28 is moved past a roller 74 that rotates on a central shaft 76. Roller 74 is pivotably supported by roller hanger 78 and is capable of both generally horizontal reciprocation and vertical movement. Roller 74 contacts the pull tab 70 on disk 22 after the disk has been tack adhered to container 28 and folds the pull tab 70 back onto the main body of disk 22 generally overlying container mouth 26. The container is then moved to a capping station of generally conventional configuration. In this location a capping assembly, indicated schematically at 80, grasps a screw threaded cap 24; for example between movable gripper fingers 82, lowers the cap downwardly onto the container 28, and twists the cap 24, as by rotation of shaft 84, to tighten the closure cap 24 down onto the container due to the cooperation of the cap's screw thread 42 with the container's screw thread 36. As the plastic linerless screw threaded closure cap 24 is screwed down onto container 28, the inner and outer downwardly extending sealing flanges 46 and 48 contact the flexible foil sealing disk 22, as described above. Outer flange 48 contacts the skirt portion 60 of disk 22 while inner flange 46 contacts a portion of disk 22 interiorly of inner neck wall 32 of container 28, and this cooperation of the sealing flanges 46 and 48 with the flexible foil sealing disk 22 draws the interposed peripheral portion 62 of disk 22, as seen most clearly in FIG. 1, taut across the upper rim surface 34 of the container 28. Such tightening of the flexible seal disk 22 in this portion 62 insures the formation of a positive, continuous seal which extends across the width of rim 34. Downward motion of closure cap 24 on container 28 also depresses and tightens the portion of flexible foil sealing disk 22 located within container mouth 26. As was also mentioned previously, this creates a smooth, crease and wrinkle free surface that has an excellent appearance.

The now foil sealed and screw cap-closed container is then subjected to a second heating step. This is preferably inductive heating and is accomplished by heater 90 in FIG. 5 which fully heats the heat activated adhesive layer or film 58 formed in the inner surface of flexible foil sealing disk. This heating step fully seals the disk to the container rim 34 after the disk 22 has been formed thereto by sealing flanges 46 and 48 on cap 24. Not only is the flexible foil sealing disk 22 sealed to the upper, generally planar rim 34, it is also sealed over the edges of the container mouth down onto the outer and inner neck walls 30 and 32, respectively, in the edge regions 53 and 55.

To summarize the process for forming and applying the two part closure assembly in accordance with the present invention, the flexible foil sealing disk 22 is formed at a location remote from the container to be sealed and is brought to the container. At the container's location, the flexible foil sealing disk is heated sufficiently to activate at least a portion of the heat activatable adhesive carried on the bottom of the disk 22. A suitable heater and die assembly 72 is used to lightly press the disk against the upper rim 34 of a container 28 so that the disk 22 is tacked in place atop the container. The now foil seal-bearing container is closed by a flanged linerless screw threaded plastic closure cap. As discussed above, the cooperation of the cap's sealing flanges with the foil disk properly positions the foil sealing disk about the rim of the container and within the container's mouth. After the closure cap has been screwed down, the closure and foil seal are subjected to sufficient heat to fully activate the adhesive film or layer. Between the step of tacking the foil disk to the container, and the application of the closure cap, the foil pull tab 70, if provided, may be turned upwardly and back by roller 74 so it overlies the body of the foil sealing disk 22. During application of the screw closure and heating of the formed two part seal, this pull tab 70 remains essentially unbonded and is accessible to the consumer once the screw closure cap has been removed.

Figure 6:
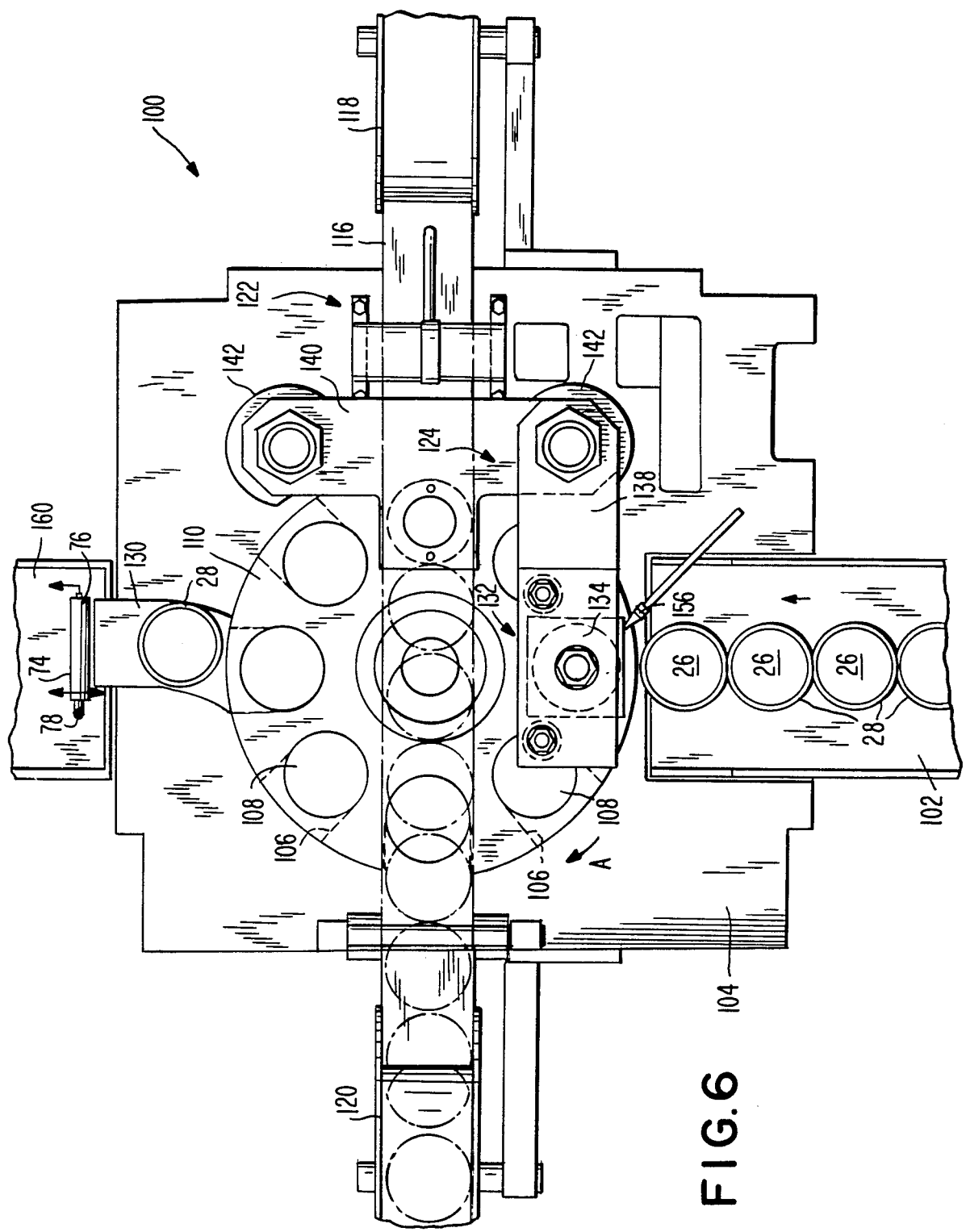
FIG. 6 is a top plan view of a first preferred embodiment of a foil seal forming and applying apparatus in accordance with the present invention.
Figure 7:
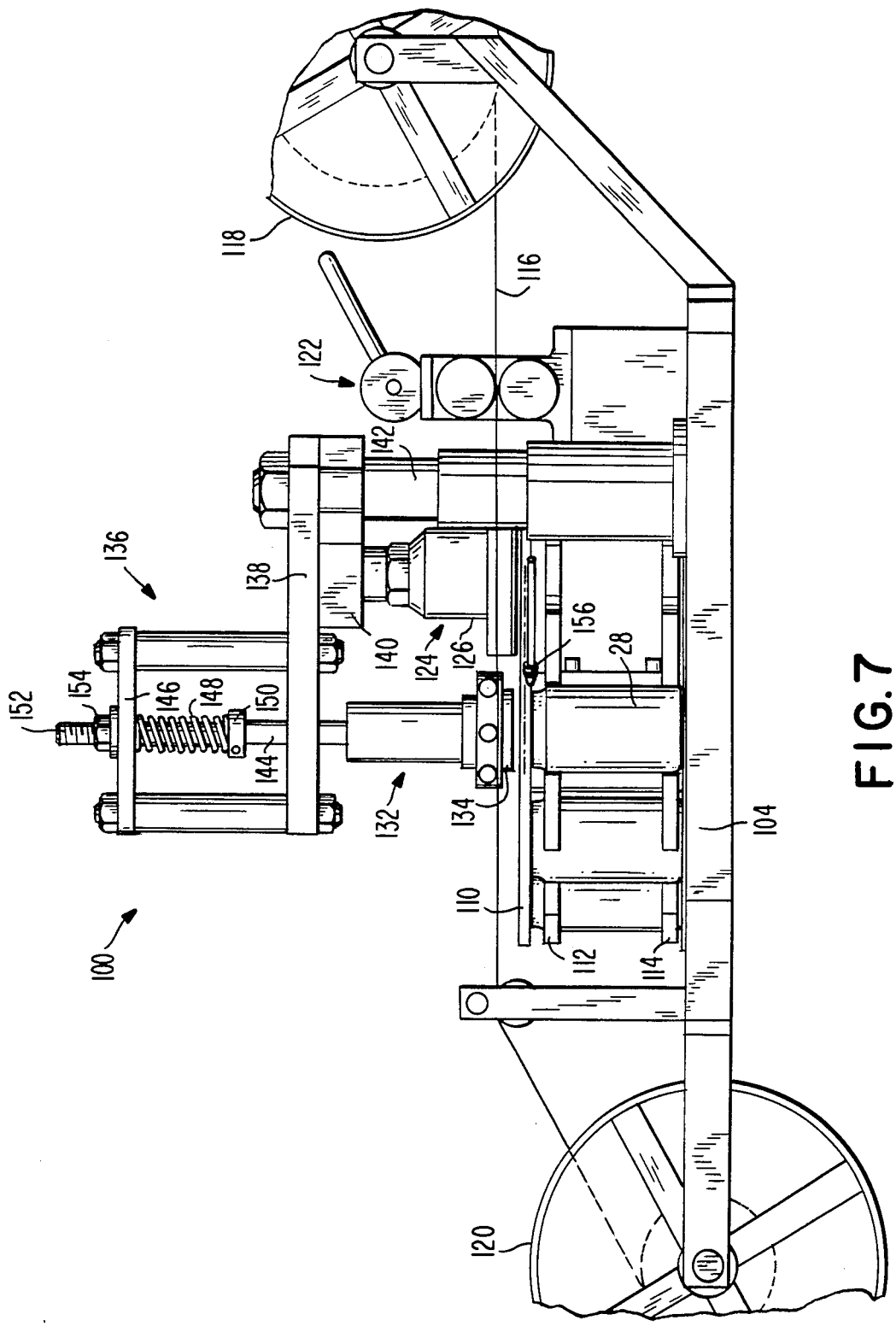
FIG. 7 is a side elevation view of the apparatus of FIG. 6.

Turning now to FIGS. 6 and 7 there may be seen generally at 100 a first preferred embodiment of a foil sealing disk forming and applying machine in accordance with the present invention. A plurality of containers 28 that have been filled in a prior step are brought to foil disk applying machine 100 on a suitable conveyor belt 102 or other suitable filled container infeed means. The containers 28 are supported on a top plate 104 and are directed into recesses 106 formed beneath circular openings 108 on a rotating punch plate, or feed wheel, 110. These recesses 106 can be formed in upper and lower rotating star wheels 112 and 114, respectively, as may be seen in FIG. 7. It will be understood that rotating punch plate, or feed wheel 110 and upper and lower star wheels 112 and 114 are properly aligned so that the mouth 26 of each container 28 underlies one of the circular openings 108 in wheel 110. Suitable well known drive means will be provided to control the rotational speeds of wheel 110 and star wheels 112 and 114.

As may be seen most clearly in FIG. 7, an elongated web 116 of a flexible foil sealing material is fed from a rotatably supported supply reel 118 in a direction diametrically across and above rotating feed wheel 110. A take-up reel 120 is provided opposite supply reel 118.

Typically, the take-up reel 120 is driven by a suitable drive means (not shown) and supply reel 118 is free to rotate. A web tension control means 122 is located just downstream from supply reel 118 and is adjustable to control the rate of web 116 withdrawal. A reciprocating foil disk punch assembly 124 is positioned so that a reciprocating cutting die 126 overlies web 116 and cooperates with a die plate 128 to sever flexible foil sealing disks such as disk 22 from the foil web 116. The punch assembly 124 is located in alignment with the circular openings 108 formed in punch plate or feed wheel 110 and is positioned between a container outfeed conveyor 130 and the container infeed conveyor 102 in the direction of rotation of circular wheel 110, which is indicated by arrow A in FIG. 6. Thus, the flexible foil sealing disks 22 cut out of web 116 by disk punch assembly 124 are cut at a point remote from the filled containers 28 on either conveyor, thereby minimizing the possibility of product contamination due to foil piece inclusion.

Each flexible foil sealing disk 22 cut by disk punch assembly 124 is deposited within one of the circular openings 108 in rotatable wheel feed 110. Each disk is held within its corresponding opening 108 by any suitable means such as, for example, an annular groove in the wall of opening 108. As rotatable wheel is indexed in the direction indicated by arrow A in FIG. 6, each opening 108 and its carried flexible foil sealing disk is in turn brought into alignment above an incoming open-mouthed filled container 28. A heat sealing station 132 overlies the rotatable punch plate or feed wheel 110 and includes a heated, vertically reciprocable sealing head 134. As illustrated in FIG. 7, heat sealing head 134 is supported for vertical motion by a suitable framework 136. This framework 136 is joined by a horizontal cross bar 138 to a support frame 140 for the disk punch 124, and both are caused to move in vertical reciprocation by spaced pneumatic or hydraulic cylinders 142. Heat sealing head 134 is carried at the lower end of a drive rod 144 which passes upwardly through an aperture in horizontal cross bar 138 and through an aligned aperture in an upper cross head 146. A coil spring 148 is secured at a lower end to a collar 150 clamped to heat sealing head drive rod 144 at a point intermediate the horizontal cross bar 138 and cross head 146. The upper end of coil spring 148 is seated beneath upper cross head 146. The upper end 152 of heat sealing head drive rod is threaded and carries an adjusting nut 154 so that the height of heat sealing head and its travel can be adjusted.

In operation, the rotatable punch plate and feed wheel 110, and its associated star wheels 112 and 114, are rotated in an intermittent, indexed fashion. During the dwell period of these wheels, the disk punch assembly 124 and the heat sealing head 134 are driven in a vertical reciprocatory manner by cylinders 142. During each such reciprocation, a foil sealing disk is cut from web 116 and is temporarily held in the punch plate or rotating feed wheel 110. A previously cut foil disk carried in a similar opening 108 in punch plate 110 which is aligned with heated sealing head 134 is simultaneously heated to activate the adhesive film layer and is moved down into contact with the rim 34 of a container 28. The interior of each of the containers 28 above its contents may be flushed by a suitable nitrogen flushing jet 156 as the sealing head 134 carries the disk 22 onto the container. Since the purpose of heat sealing head 134 is only to tack the flexible foil sealing disk to the rim 34 of container 28, the force of spring 148 is selected so that heat sealing head does not exert a great deal of force against the rim of the container. The heat sealing head 134 and the cutting die or punch 126 then retract, and the rotating wheel 110 and star wheels 112 and 114 index one step in the clockwise direction, as seen in FIG. 6, and the foil web 116 advances to the left so that a fresh section of web is brought beneath cutting die 126. Indexing of the wheels and cutting and assembly of the disks and containers is repeated with containers being fed into the star wheels and being sequentially sealed. The foil closed container 28 are fed to the outfeed conveyor 130, and the containers are transferred to a take away conveyor 160 which transfers the foil disk carrying containers 28 to the capping machine (in FIG. 6) for capping and subsequent heat treatment in the manner discussed previously with respect to FIGS. 4 and 5. The tab folding roller 74 may be positioned above and at the start of take away conveyor 160, as seen in FIG. 6 and operates in the manner discussed with reference to FIG. 3.

Figure 8:
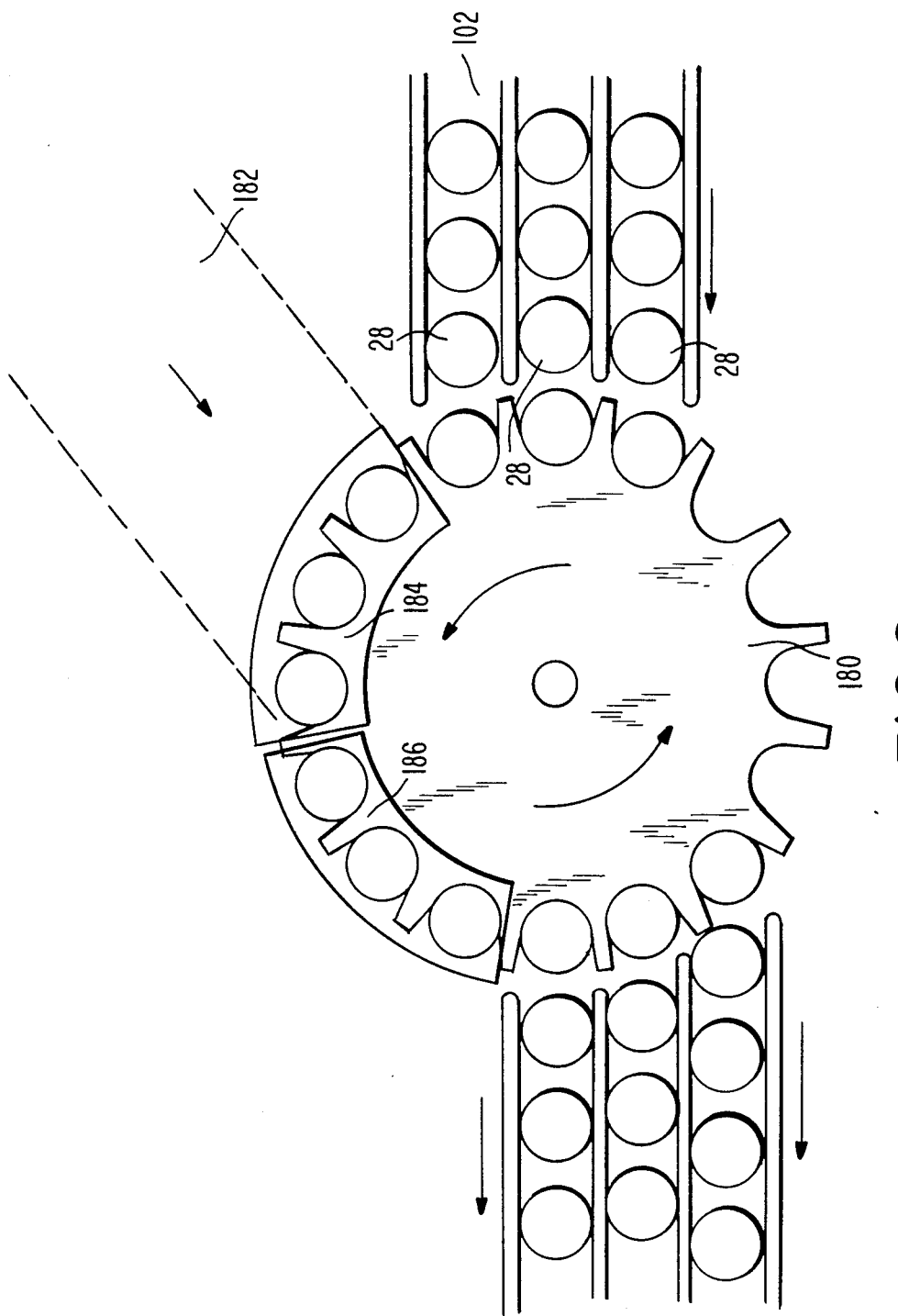
FIG. 8 is a schematic top plan view of a second preferred embodiment of a foil seal forming and applying apparatus in accordance with the present invention.

The embodiment of the foil disk forming and tack adhering machine 100 of FIGS. 6 and 7 operates with a single line of containers 28. While this may be suitable for some production situations, in other instances, higher production capacities may require increased capabilities. Since, in the preferred embodiment, a ⅛ second dwell time is required at the heat sealing station for the heated head to heat the flexible foil film to the necessary temperature, for example, 350° F. for proper activation of the adhesive, the speed of operation cannot be increased above this dwell time restriction. Thus, as is shown schematically in FIG. 8 a multiple heat punching and heat sealing station assembly can be used to cut and attach multiple flexible foil sealing disks during each dwell period. As may be seen in FIG. 8 infeed conveyor 102 now carries three rows of containers 28 in a side by side array. These containers are placed in a star wheel assembly 180 generally similar to star wheels 112 and 114 of apparatus 100. It will be understood that in FIG. 8 the star wheel assembly 180 does not include a showing of a punch plate or rotary wheel similar to wheel 110 but that such a wheel is present. A foil web, shown schematically in dashed lines at 182 enters at a diagonal angle to increase the effective usable area for seal cutting in a disk punching assembly shown schematically at 184. A heat sealing station 186 is positioned adjacent disk punching assembly 184. Each of these assemblies is functionally the same as its equivalent in the single punch assembly 100, as discussed with reference to FIGS. 6 and 7. In the three punch assembly of FIG. 8, each reciprocation of the die cutter and the heat sealing head handles three containers 28 instead of one, as is the case with the apparatus 100. Thus the three punch assembly shown in FIG. 8 has three times the capacity of the FIGS. 6 and 7 assembly. It will be apparent that a two punch or four punch assembly could also be provided and that the number of cutting dies and heat sealing heads can be varied to some extent depending on the capacity required.

Figure 9:
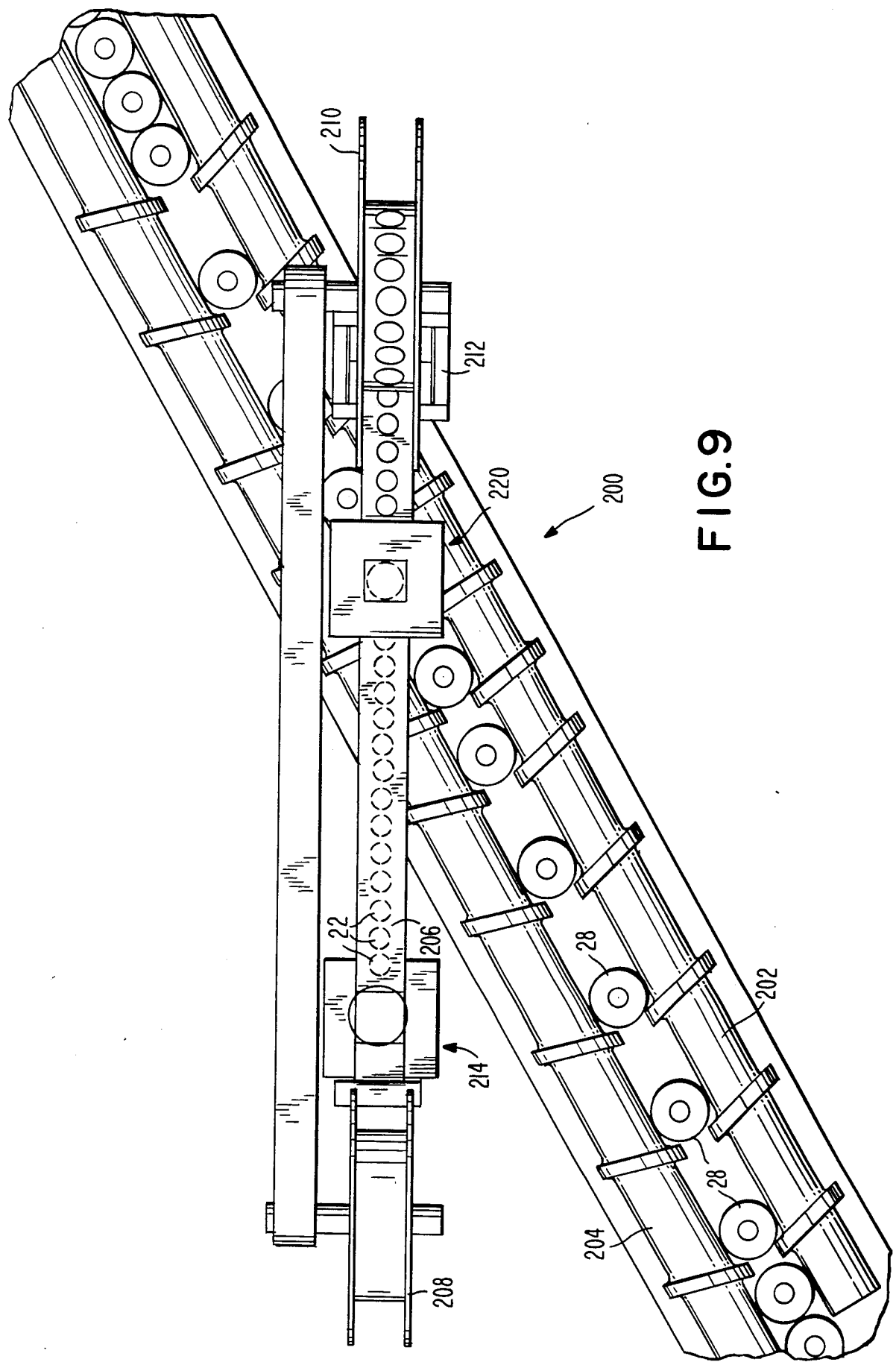
FIG. 9 is a top plan view of a third preferred embodiment of a foil seal forming and applying apparatus in accordance with the present invention.

Turning now to FIGS. 9 and 10, there is illustrated, generally at 200, a third preferred embodiment of a flexible foil seal forming and tack attaching assembly in accordance with the present invention. As opposed to the embodiments shown in FIGS. 6, 7, and 8 in which the various containers are positioned in a rotary wheel and are taken out of their prior path of travel, the apparatus shown in FIGS. 9 and 10 can be characterized as a straight through assembly. A pair of spaced timing screws 202 and 204 receive containers 28 and advance the containers in a linear sequence in a generally conventional manner. A web of flexible foil 206 is carried on a freely rotatable supply reel 208, as may be seen in FIG. 10, and is taken up by a driven take up reel 210. The foil web's tension is controlled by a pull type indexing mechanism 212. Shortly after the foil web 206 leaves the supply reel 208 it is directed to a punching station 214 where a punch 216, driven in vertical reciprocation by a pneumatic cylinder 218 or the like, partially severs a foil sealing disk from the web 206. It is important to note that the foil sealing disk is only partially severed from the web since, in this embodiment, the web acts as the transport means for the sealing disks after they have been formed at the punch station 214. The web and partially severed disks are advanced to a heat sealing station 220 where a heat sealing head 222 is vertically reciprocated by a suitable pneumatic cylinder 224 or other means. Heat sealing station 220 directly overlies the spaced timing screws 202 and 204 whose thread pitches are structured to produce a dwell time for each container 28 as it comes beneath the heat sealing station 220. This dwell time is sufficient to allow the heat sealing head 222 to pass downwardly through the foil web 206, thereby completely severing a previously partially cut out foil sealing disk 22 and heating it sufficiently that it can be tacked to the rim of a container 28 positioned beneath. As was discussed with the prior embodiments, the timing of the advance of foil web 206 is coordinated with the reciprocation of the punch 216 and of the heat sealing head so that the web will stop while the disk is being cut and while a previously partially severed disk is simultaneously being pushed out of foil web 206 and onto the rim of the bottle or container 28. Since, the flexible foil disk 22 cannot be cut in web 206 nor applied to container 28 in this embodiment if the web 206 is moving, the motion of the web is intermittent, and indexed to the motions of the punch 214 and heat sealing head 222.

Punching station 214 is positioned away from heat sealing station 220 and is offset out of the line of container travel caused by timing screws 202 and 206 so that cut pieces of foil again will not be apt to be introduced into the open mouths of containers 28. As may be seen in FIG. 9, the direction of web travel is offset from the direction of container travel. This positions the punching station 214 away from the open containers and also, as with the apparatus shown in FIG. 8, allows plural flexible foil sealing disks to be cut on a diagonal line across the foil web thereby utilizing as much of the web as possible. Additional parallel lead screw conveyors and additional sealing head assemblies can also be provided so that multiple containers can have flexible foil sealing disks tack applied to them at the same time. Thus, as with the apparatus discussed in conjunction with FIGS. 6, 7, and 8, the linear foil sealing disk forming and applying apparatus of FIGS. 9 and 10 can have an increased capacity by providing plural parallel conveyor screws to move plural containers beneath a multi-seal heat sealing station for simultaneous application of plural flexible foil sealing disks partially cut out of web 206 at multiple punching stations 214. As with the previously discussed turntable assemblies, the in-line assembly of FIGS. 9 and 10 discharges containers with tack-applied flexible foil sealing disks which then are directed to a suitable and generally well known capping station (not shown) for application of flanged, linerless, screw threaded closure caps and for subsequent heat treatment of the now formed two part closure, as was previously discussed with reference to FIGS. 4 and 5. A tab folding roller assembly, generally at 230 as seen in FIG. 10, may be used to fold the tabs 70 on disks 22, in the manner discussed with reference to FIG. 3.

While a two part closure having a flexible foil sealing disk and a flanged linerless screw threaded closure cap functioning together to provide a new and beneficial seal for a container, together with a process for the application of the two part closure to a container as well as several preferred embodiments of apparatus for forming and attaching the flexible foil sealing disk to a container, have been fully and completely disclosed hereinabove, it will be obvious to one of skill in the art that a number of changes, for example, in the materials used for the container and its size, the type of flexible foil sealing disk and its heat actuated adhesive film or layer, the inclusion of various features in addition to the sealing flanges in the closure cap, the type and structure of the various container infeed and take away conveyors, the structure of the timing screws, and the specific cap applying and heating means, could be made without departing from the true spirit and scope of the present invention which is accordingly to be limited only by the following claims.

We claim:

1. A process for forming a two part closure on a container having an open mouth defined by an upper, generally planar mouth rim that extends between inner and outer edges of spaced inner and outer neck walls, respectively, said process comprising:

forming a flexible foil sealing disk having a diameter slightly larger than the diameter of said container mouth and further having an annular skirt portion at its edge;

attaching said flexible foil sealing disk atop said container mouth and in engagement with said mouth rim and with said annular skirt portion of said flexible foil sealing disk overlying an upper portion of said outer neck wall of said container;

subsequently positioning a linerless closure cap having downwardly extending spaced inner and outer sealing flanges on said container mouth with said spaced inner and outer sealing flanges engaging an interposed peripheral portion of said flexible foil sealing disk, and with an inner surface of said downwardly extending outer sealing flange contacting said annular skirt portion of said flexible foil sealing disk and causing said annular skirt to contact said outer neck wall of said container, and with an outer surface of said downwardly extending inner sealing flange contacting said flexible foil sealing disk and causing said sealing disk to contact an upper portion of said inner neck wall of said container; and securing said closure cap to said container and moving said spaced inner and outer sealing flanges downwardly along said upper portions of said inner and outer neck walls, said downwardly moving outer sealing flange placing said annular skirt portion of said flexible foil sealing disk into tight sealing engagement with said outer neck wall, said downwardly moving inner sealing flange exerting a downward force on a central portion of said flexible foil sealing disk positioned within said container mouth and drawing said central portion of said flexible sealing disk within said container mouth taut, said spaced inner and outer sealing flanges further cooperating as they are moving downwardly to pull said peripheral portion of said flexible foil sealing disk overlying said mouth rim into intimate, positive sealing contact across said mouth rim and to draw said peripheral portion of said flexible sealing disk taut.

2. The process of claim 1 further including forming said flexible foil sealing disk at a location remote from a location for applying said disk to said container.

3. The process of claim 1 further including forming said flexible foil sealing disk having a heat activated adhesive layer.

4. The process of claim 3 further including tack adhering said flexible foil sealing disk atop said container mouth in a first heating step prior to securement of said closure cap to said container.

5. The process of claim 4 further including subjecting said container having said two part closure secured thereto to a second heating step to activate said heat activated adhesive layer.

6. The process of claim 1 further including forming said flexible foil sealing disk having a pull tab extending outwardly from a peripheral portion of said sealing disk.

7. The process of claim 6 further including folding said pull tab onto said flexible foil sealing disk prior to securing said closure cap to said container.

* * * * *